(12) United States Patent
Ohashi et al.

(10) Patent No.: US 7,986,865 B2
(45) Date of Patent: Jul. 26, 2011

(54) IMAGING DEVICE AND RECORDING CONTROL METHOD

(75) Inventors: Hisashi Ohashi, Kanagawa (JP); Isao Sasaki, Chiba (JP); Takao Ohsawa, Tokyo (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 10/585,087

(22) PCT Filed: Oct. 24, 2005

(86) PCT No.: PCT/JP2005/019506
§ 371 (c)(1),
(2), (4) Date: May 27, 2009

(87) PCT Pub. No.: WO2006/049028
PCT Pub. Date: May 11, 2006

(65) Prior Publication Data
US 2009/0226151 A1    Sep. 10, 2009

(30) Foreign Application Priority Data
Nov. 5, 2004  (JP) ................................ 2004-321770

(51) Int. Cl.
*H04N 5/77* (2006.01)
(52) U.S. Cl. ..... 386/224; 386/210; 386/328; 358/909.1; 348/207.99; 348/333.02
(58) Field of Classification Search .................. 386/200, 386/210, 224, 314, 326–337; 358/906, 909.1; 348/207.99, 333.02, 333.04
See application file for complete search history.

(56) References Cited

U.S. PATENT DOCUMENTS
5,956,461 A * 9/1999 Abe et al. .................. 386/117

FOREIGN PATENT DOCUMENTS

| | | |
|---|---|---|
| EP | 1 005 042 A2 | 5/2000 |
| JP | 63-289540 | 11/1988 |
| JP | 08-149408 | 6/1996 |
| JP | 08-306133 | 11/1996 |
| JP | 2000-165803 | 6/2000 |
| JP | 2005-182953 | 7/2005 |

* cited by examiner

*Primary Examiner* — Thai Tran
*Assistant Examiner* — Mishawn Dunn
(74) *Attorney, Agent, or Firm* — Finnegan, Henderson, Farabow, Garrett & Dunner, L.L.P.

(57) ABSTRACT

The recording operation can be rapidly started and a notification about the operating state during the recording operation can be realized without adding a new component, whereby a target scene of a subject can be recorded reliably. When a video signal captured by a camera unit 10 is compressed and encoded and is recorded on a DV tape, a control unit 100 controls a compression/decompression unit 40 and a tape deck unit 60 to compress and encode the video signal and record as DV data without using compressed data already recorded on the DV tape. In other words, the control unit 100 controls the operation of compressing and encoding video data to be newly recorded in such a manner that compressed data already recorded on the DV tape is not read out, thus reducing the time until recording of the video data on the DV tape is started.

9 Claims, 5 Drawing Sheets

IMAGING DEVICE AND RECORDING CONTROL METHOD

TECHNICAL FIELD

The present invention relates to an imaging device, such as a digital camcorder, for performing compression encoding (data compression) of video signals captured by shooting to generate compressed data and recording the data on various recording media, and a recording control method used in the imaging device.

BACKGROUND ART

Digital camcorders using a data compression encoding method, e.g., called the MPEG (Moving Picture Experts Group) format, are in widespread used. In such a digital camcorder, when a new scene is recorded just after the last recorded scene on a recording medium on which video data has already been recorded, what is called a smooth transition sequence (smooth transition processing) is executed so that transition between the last video data recorded and the next video data newly recorded is smooth without any distortion in pictures newly recorded.

In the smooth transition sequence, video signals are compressed by compression encoding in the MPEG format using predictive coding. In order to compress and encode video signals to be newly recorded without causing any distortion in pictures, therefore, a predetermined amount of compressed and encoded video data already recorded on a recording medium is needed. Accordingly, in the smooth transition sequence, a step of reading a predetermined amount of compressed data already recorded on the recording medium is executed in order to properly compress and encode video data to be newly recorded.

In the smooth transition sequence, however, since the step of reading compressed data already recorded on the recording medium has to be performed, it may take considerable time after a user instructs to start shooting before video data is actually recorded on the recording medium. In other words, a time lag exists between the time when a recording start instruction is issued and the time when recording of video data on the recording medium is actually started.

Japanese Unexamined Patent Application Publication No. 8-306133 discloses the following technique for eliminating the time lag: Means for recording scenes (video data) on a delay memory other than a recording medium is provided so that a scene captured after a recording instruction is issued until recording on the recording medium is actually started and a scene obtained before the recording instruction is issued can be recorded. The use of the technique disclosed in Japanese Unexamined Patent scene, shot just after a recording start instruction is issued, to be recorded on the recording medium.

In the use of the above-described technique disclosed in Japanese Unexamined Patent Application Publication No. 8-306133, however, it is necessary to use the delay memory having a certain storage capacity. It results in an increase in cost of the digital camcorder. Unfortunately, it is difficult to meet the demand for a reduction in cost of the digital camcorder.

In a digital camcorder which does not utilize the above-described technique disclosed in Japanese Unexamined Patent Application Publication No. 8-306133, as described above, a time lag occurs between the time when a recording start instruction is issued and the time when recording of video data on a recording medium is actually started. Therefore, it is necessary to clearly inform a user that actual recording is not yet started during the time lag.

In consideration of the above-described problems, it is an object of the present invention to provide a device and method capable of rapidly starting the recording operation and realizing a notification about the operating state during the recording operation without adding a new component so that a target scene of a subject can be recorded reliably.

DISCLOSURE OF INVENTION

To solve the above-described problems, according to claim 1 of the present invention, there is provided an imaging device including:

imaging means for imaging a subject to output a video signal;

compression means for compressing the video signal supplied from the imaging means by a data compression method using predictive coding;

writing/reading means for performing a process of writing compressed data obtained by the compression means to a recording medium and a process of reading out already recorded compressed data from the recording medium; and control means for controlling the compression means and the writing/reading means upon starting the recording of the video signal so that the compressed data already recorded on the recording medium is not used for compression encoding of the video signal to be newly recorded.

In the imaging device according to claim 1 of the present invention, when the video signal supplied from the imaging means is compressed and encoded and is recorded on the recording medium, the control means controls the compression means and the writing/reading means to compress and encode the video signal and record obtained compressed data on the recording medium without using the compressed data already recorded on the recording medium.

Thus, when a new video signal is compressed and is recorded such that transition between the last compressed data recorded on the recording medium and the next video data newly recorded is smooth, the process of reading out the compressed data already recorded on the recording medium for compression encoding of the video signal to be newly recorded can be omitted, thus reducing the length of time between when a recording start instruction is received and when a video signal obtained by shooting is compressed and is recorded on the recording medium. Therefore, a target scene of a subject can be recorded reliably. In addition, it is unnecessary to add a new component, such as a buffer memory.

According to claim 2 of the present invention, the imaging device according to claim 1 may further include:

receiving means for receiving an input indicating a selected mode upon starting the recording of the video signal, the mode being selected between one mode where the compressed data already recorded on the recording medium is not used for compression encoding of the video signal to be newly recorded and the other mode where the compressed data already recorded on the recording medium is read out and is used for compression encoding of the video signal to be newly recorded, wherein when the mode where the compressed data already recorded on the recording medium is read out and is used for compression encoding of the video signal to be newly recorded is selected, the control means controls the compression means and the writing/reading means to read out the compressed data already recorded on the recording medium and use the read-out data for compression encoding of the video signal to be newly recorded.

In the imaging device according to claim 2 of the present invention, when a new video signal is recorded, an input indicating a mode selected between the mode where the compressed data already recorded on the recording medium is not used for compression encoding of the video signal to be newly recorded and the other mode where the compressed data already recorded on the recording medium is read out and is used for compression encoding of the video signal to be newly recorded may be received through the receiving means.

When the mode where the compressed data already recorded on the recording medium is read out and is used for compression encoding of the video signal to be newly recorded is selected, the control means controls the compression means and the writing/reading means to read out the compressed data already recorded on the recording medium and use the read-out data for compression encoding of the video signal to be newly recorded.

Consequently, the user can arbitrarily select between the modes to record a newly obtained video signal on the recording medium through the receiving means. The newly obtained video signal may be compressed and encoded and be recorded on the recording medium such that transition between the last video signal as compressed data already recorded on the recording medium and the newly recorded video signal is smooth.

According to claim 3 of the present invention, the imaging device according to claim 1 or 2 may further include:

notification means for notifying a user that recording is being prepared for a period of time after a recording start request is received from the user until the recording of the compressed data on the recording medium is actually started.

In the imaging device according to claim 3 of the present invention, the notification means notifies the user that recording is being prepared for a period of time after a recording start request is received from the user until the recording of the compressed data on the recording medium is actually started. Thus, it is possible to clearly inform the user from which image is actually recorded on the recording medium. The user can clearly recognize the information.

According to claim 4 of the present invention, the imaging device according to claim 2 may further include:

notification means for notifying a user that recording is being prepared for a period of time after a recording start request is received from the user until the recording of the compressed data on the recording medium is actually started when the mode where the compressed data already recorded on the recording medium is read out and is used for compression encoding of the video signal to be newly recorded is selected upon starting the recording of the video signal.

In the imaging device according to claim 4 of the present invention, when the mode where the compressed data already recorded on the recording medium is read out and is used for compression encoding of the video signal to be newly recorded is selected, the notification means notifies the user that recording is being prepared for a period of time after a recording start request is received from the user until the recording of the compressed data on the recording medium is actually started. Thus, it is possible to clearly inform the user from which image is actually recorded on the recording medium. The user can clearly recognize the information.

In the device according to claim 1 and a method according to claim 5, the length of time between when a recording start instruction is received and when recording is actually started is reduced, thus preventing failing to capture the decisive moment. A target scene of a subject can be recorded reliably.

In the device according to claim 2 and a method according to claim 6, the user may determine whether to reduce the length of time between when a recording start instruction is received and when recording is actually started. Thus, the use may select either of the modes depending on a subject to be shot and shoot the subject in a manner suitable for the subject. On the other hand, when the time until recording starts is not reduced, video data can be recorded so that images can be played in such a manner that transition between the last compressed and encoded video data recorded on the recording medium and the newly recorded video data is smooth.

In each of the devices according to claims 3 and 4 and each of methods according to claims 7 and 8 of the present invention, it is possible to inform the user that recording is being prepared for a period of time after a recording start instruction is received until recording is actually started. Consequently, the current operating state of the device can be more accurately shown, thus reducing the user's anxiety about operation (use) of the device.

BEST MODE FOR CARRYING OUT THE INVENTION

A device and method according to an embodiment of the present invention will now be described below with reference to the drawings. In the embodiment which will be described below, a digital camcorder will be explained as an example of the application of the device and method according to the present invention.

Digital Camcorder

Figure 1:
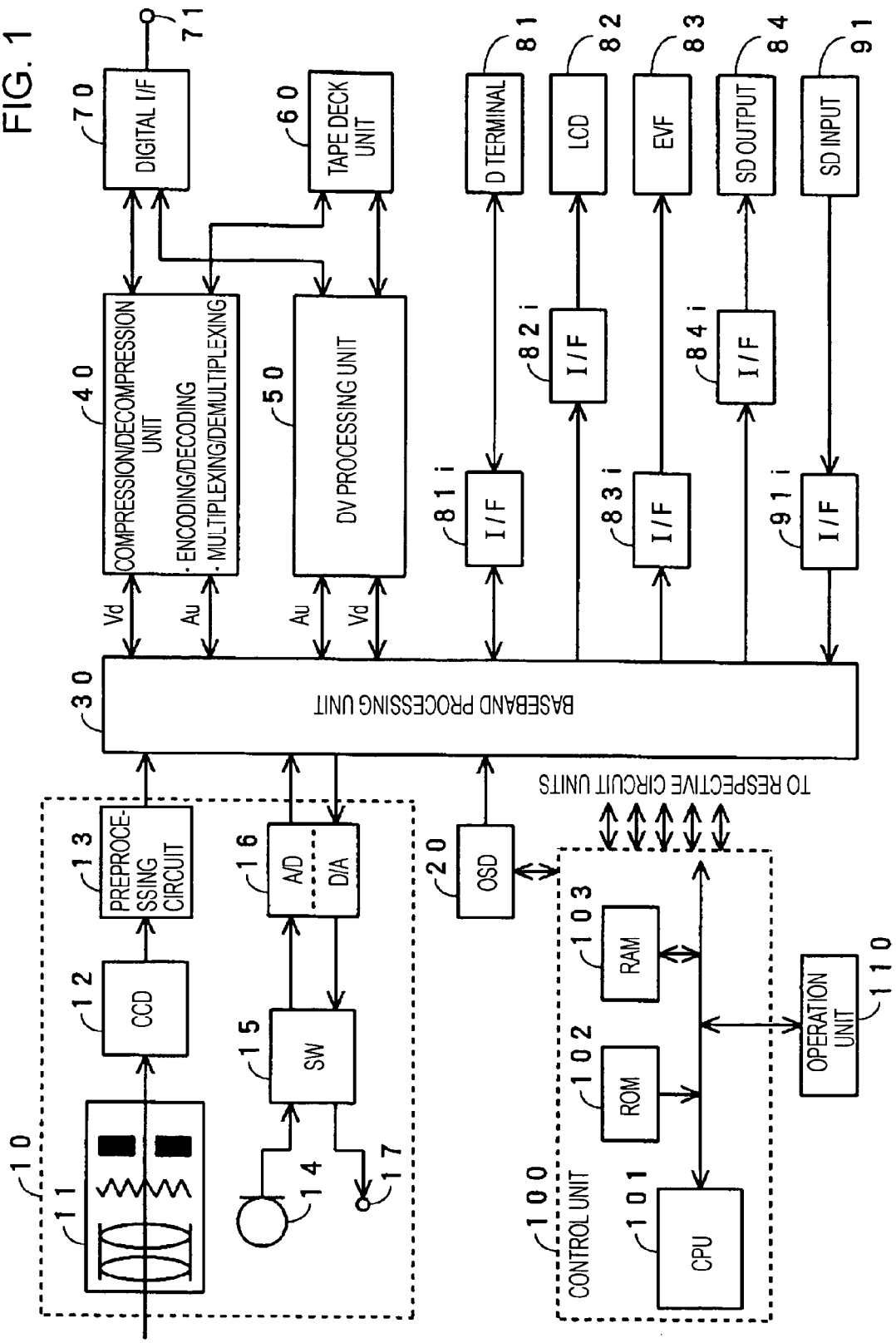
FIG. 1 is a block diagram explaining a digital camcorder to which a device and method according to the present invention is applied.

FIG. 1 is a block diagram explaining the digital camcorder to which the device and method according to the embodiment of the present invention are applied. Referring to FIG. 1, the digital camcorder according to the present embodiment includes a camera unit 10, an OSD (On Screen Display) unit 20, a baseband processing unit 30, a compression/decompression unit 40, a DV (Digital Video) processing unit 50, a tape deck unit 60, a digital interface (hereinafter, abbreviated to digital I/F) 70, and a digital input-output terminal 71.

The digital camcorder according to the present embodiment further includes a D terminal 81, an LCD 82, and an EVF (Electro View Finder) 83, and an SD output terminal 84, serving as video output terminal units. In addition, the digital camcorder includes an SD input terminal 91, serving as a video input terminal unit. The digital camcorder includes interfaces (simply abbreviated to I/Fs in FIG. 1) 81*i*, 82*i*, 83*i*, 84*i*, and 91*i* compatible with the respective output and input terminal units. In addition, the digital camcorder includes a control unit 100 for controlling the respective units.

The control unit 100 is a microcomputer including a CPU (Central Processing Unit) 101, a ROM (Read Only Memory) 102, and a RAM (Random Access Memory) 103 connected via a CPU bus as shown in FIG. 1. The ROM 102 is a flash ROM or an EEPROM (Electrically Erasable and Programmable ROM). The ROM 102 stores various programs executed by the CPU 101 and data necessary for processes. In addition, the ROM 102 can receive configuration information, such as parameters, set by a user and store the information. In the following description, it is assumed that the ROM 102 is a flash ROM. The RAM 103 temporarily stores data which is being processed, i.e., it is mainly used as a work area.

The control unit 100 is connected to an operation unit 110 having various operation keys and operation dials so that an operation input can be received from the user through the operation unit 110. Accordingly, the control unit 100 can control the respective units in response to an instruction input (operation input) received from the user through the operation unit 110.

For ease for explanation, the camera unit 10 according to this embodiment includes a video system and an audio system. In other words, the video system of the camera unit 10 includes an optical block 11, a CCD (Charge Coupled Device) 12, and a preprocessing circuit 13. The optical block 11 includes a lens, a focusing mechanism, a shutter mechanism, and a diaphragm (iris) mechanism. The audio system includes a microphone 14, an input-output processing unit 15, a conversion unit 16 for A/D (Analog/Digital) conversion and D/A (Digital/Analog) conversion, and an audio output terminal 17.

According to the present embodiment, the video system of the camera unit 10 has two shooting modes, i.e., an HD mode where an image of a subject is captured as an image having an aspect ratio of 16:9 and an SD mode where an image of the subject is captured as an image having an aspect ratio of 4:3. Under the control of the control unit 100, the video system can switch between the two shooting modes in accordance with a user instruction input.

When receiving an instruction input for shooting through the operation unit 110, the control unit 100 controls the respective components of the digital camcorder according to the present embodiment to start the shooting operation. In this case, the control unit 100 controls the focusing mechanism, the shutter mechanism, and the iris mechanism of the optical block 11 to capture an image of the subject. The captured image is supplied to the CCD 12.

The CCD 12 converts light, serving as the image supplied from the optical block 11, into an electric signal and outputs the signal. In other words, the CCD 12 captures the subject image supplied from the optical block 11 and supplies the captured subject image (image information) as the electric video signal to the preprocessing circuit 13. The preprocessing circuit 13 performs CDS (Correlated Double Sampling) on the supplied video signal to favorably keep the S/N ratio and also performs AGC (Automatic Gain Control) on the signal to control the gain and further converts the signal that is analog into a digital signal, serving as video data Vd0. The preprocessing circuit 13 supplies the video data Vd0 to the baseband processing unit 30.

On the other hand, during shooting, sound collected through the microphone 14 is converted into an electric signal and the signal is then amplified by the input-output processing unit 15. The resultant signal is supplied to the conversion unit 16. The conversion unit 16 converts the analog audio signal supplied from the input-output processing unit 15 into a digital signal, serving as audio data Au0, and supplies the data to the baseband processing unit 30.

Under the control of the control unit 100, the baseband processing unit 30 receives graphics data or text data to be combined with video data, e.g., a shooting auxiliary marker from the OSD unit 20, and combines the data with the video data Vd0 supplied from the camera unit 10, thus generating the resultant video data. The baseband processing unit 30 supplies the generated data to the respective units, e.g., the compression/decompression unit 40, the DV processing unit 50, the D terminal 81, the LCD 82, the EVF 83, and the SD output terminal 84.

When the video data processed by the baseband processing unit 30 is video data (HD signal) with the aspect ratio of 16:9 captured in the HD mode, the baseband processing unit 30 supplies video data (HD signal) Vd1 and audio data Au1 to the compression/decompression unit 40. The compression/decompression unit 40 compresses (encodes) the supplied video data Vd1 and audio data Au1 in, e.g., the MPEG (Moving Picture Experts Group) format and then multiplexes the compressed video data and audio data.

Multiplexed data (MPEG signal), obtained by multiplexing the video and audio data in the compression/decompression unit 40, is supplied to the tape deck unit 60 and is then written (recorded) on a DV (Digital Video) tape loaded therein. The multiplexed data can also be output through the digital I/F 70 and the digital input-output terminal 71.

In the digital camcorder according to the present embodiment, the digital I/F 70 and the digital input-output terminal 71 each function as an interface compatible with IEEE (Institute of Electrical and Electronics Engineers) 1394 standard. Each of the digital I/F 70 and the digital input-output terminal 71 may include a digital interface compatible with another standard, e.g., the USB (Universal Serial Bus) standard.

When the video data processed by the baseband processing unit 30 is a DV format signal (DV signal), video data (DV signal) Vd2 and audio data Au2 are supplied from the baseband processing unit 30 to the DV processing unit 50. The DV processing unit 50 multiplexes the supplied video data Vd2 and audio data Au2.

Multiplexed data, obtained by multiplexing the video and audio data through the DV processing unit 50, is supplied to the tape deck unit 60 and is then written (recorded) on a DV (Digital Video) tape loaded therein. The multiplexed data can also be output through the digital I/F 70 and the digital input-output terminal 71.

As described above, during shooting, the baseband processing unit 30 supplies video signals input from the camera unit 10 to the D terminal 81, the LCD 82, the EVF 83, and the SD output terminal 84. The D terminal 81 is an analog interface for outputting an analog signal, e.g., an HD signal. The D terminal according to the present embodiment is called a D4 terminal compatible with 480i, 480p, 1080i, and 780p. The D terminal can output a video signal having the aspect ratio of 16:9.

As for the terms "480i" and "480p", each number indicates the number of effective scanning lines, the character "i" following the number denotes an interlaced scan (skip scan) video signal, and the character "p" following the number indicates a progressive scan (sequential scan) video signal. Therefore, the term "480i" stands for an interlaced-scan video signal having 480 effective scanning lines and the term "480p" stands for a progressive-scan video signal having 480 effective scanning lines.

Each of the LCD 82 and the EVF 83 is compatible with a video signal having the aspect ratio of 16:9. The SD output terminal 84 is an output terminal for an analog video signal, serving as an SD signal having the aspect ratio of 4:3.

Each of the I/Fs 81*i*, 82*i*, 83*i*, and 84*i*, arranged for the output terminal units 81, 82, 83, and 84, respectively, has a function of converting video data supplied from the baseband processing unit 30 into an analog video signal to be supplied to the corresponding video output terminal unit.

When an MPEG signal (signal obtained by multiplexing video and audio data compressed in the MPEG format) is received through the digital input-output terminal 71 and the digital I/F 70, alternatively, when an MPEG signal is read from a DV tape loaded in the tape deck unit 60, the MPEG signal is supplied to the compression/decompression unit 40, where the signal is demultiplexed into video data and audio data and the video data and the audio data are decompressed into original video and audio data. The decompressed video data and audio data are supplied to the baseband processing unit 30.

The baseband processing unit 30 receives the video and audio data from the compression/decompression unit 40. Then, the baseband processing unit 30 supplies the video data to the D terminal 81, the LCD 82, the EVF 83, and the SD output terminal 84 and supplies the audio data to the conversion unit 16, where the audio data is converted into an analog audio signal. The signal is subjected to processing, e.g., signal format processing, through the input-output processing unit 15. The resultant signal is output from the audio output terminal 17.

Similarly, when a DV signal (signal obtained by multiplexing DV-format video and audio data) is received through the digital input-output terminal 71 and the digital I/F 70, alternatively, when a DV signal is read from a DV tape loaded in the tape deck unit 60, the DV signal is supplied to the DV processing unit 50, where the signal is demultiplexed into video data and audio data. The video data and the audio data are supplied to the baseband processing unit 30.

After receiving the video data and the audio data from the DV processing unit 50, the baseband processing unit 30 supplies the video data to the D terminal 81, the LCD 82, the EVF 83, and the SD output terminal 84 in a manner similar to the above-described playback of the MPEG signal. In addition, the baseband processing unit 30 supplies the audio data to the conversion unit 16, where the audio data is converted into an analog audio signal. After that, the audio signal is subjected to processing, e.g., signal format processing by the input-output processing unit 15 and the resultant signal is then output from the audio output terminal 17.

An MPEG signal or DV signal received through the digital I/F can be recorded on a DV tape loaded in the tape deck unit 60. An SD signal received through the SD input terminal 91 can also be recorded on a DV tape loaded in the tape deck unit 60. The I/F 91*i* has a function of converting an SD signal received through the SD input terminal 91 into a digital signal.

As described above, the digital camcorder according to the present embodiment is capable of converting video signals captured and audio signals collected through the camera unit 10 into digital signals and outputting or recording the signals on a DV tape and also converting video and audio signals, received through the input-output terminals and the input terminal, into digital signals and outputting or recording the signals on a DV tape. In addition, the digital camcorder is capable of playing back video and audio data recorded on a DV tape and video and audio data received through the input-output terminals and the input terminal.

Tape Deck Unit

The structure and operation of the tape deck unit 60 of the digital camcorder according to the present embodiment will now be described with reference to FIG. 2. The tape deck unit 60 mainly includes: a mechanical deck section 61 in which a DV tape cassette 200 receiving a DV tape 201 is loaded; and a servo circuit 62 for driving and controlling respective components of the mechanical deck section 61, e.g., controlling the rotation of a tape motor or a rotary head cylinder. The servo circuit 62 can control the respective components of the mechanical deck section 61 in accordance with a control signal CT from the control unit 100.

Figure 2:
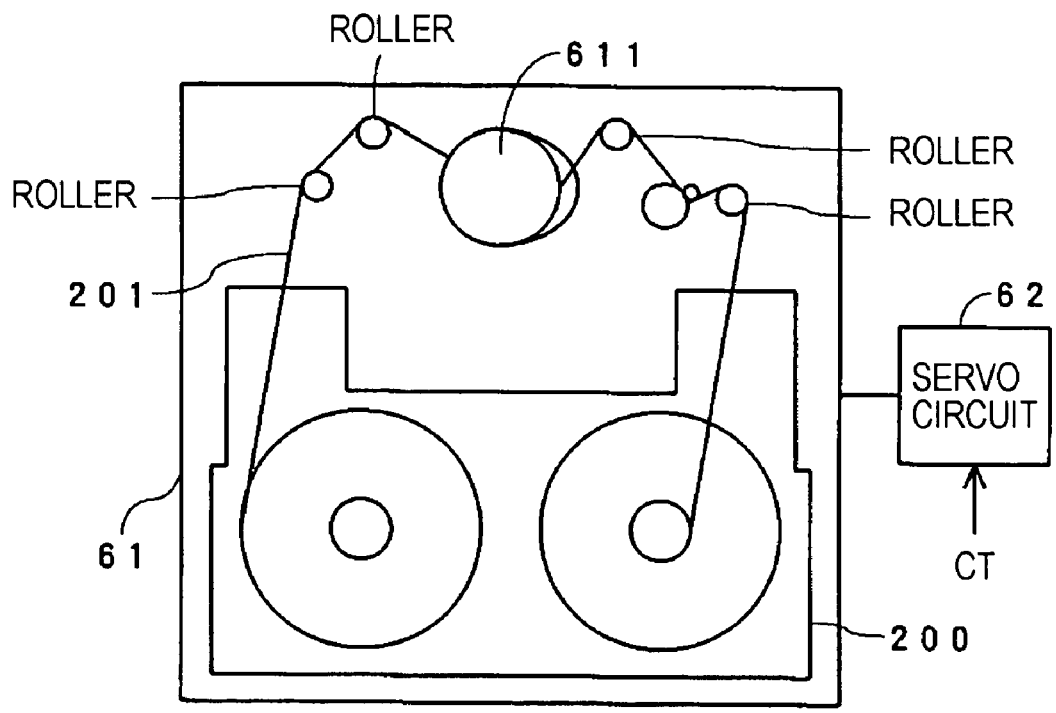
FIG. 2 is a diagram explaining a tape deck unit.

After the digital camcorder according to the present embodiment is turned on, when the DV tape cassette 200 is loaded into the tape deck unit 61 of the digital camcorder, a loading mechanism of the tape deck unit 60 works to draw the DV tape (magnetic tape) 201 out of the DV tape cassette 200 and guide the DV tape 201 onto a rotary head cylinder 611 using several arranged rollers for supporting tape travel as shown in FIG. 2.

In order to convert video signals of a scene captured through the camera unit 10 into video data in the MPEG format by the compression/decompression unit 40 and record the data on the DV tape 201, the servo circuit 62 controls the rotation of the rotary head cylinder 611, the mechanical deck section 61 slightly rewinds the DV tape 201 from the current tape position, and the rotary head cylinder 611 reads video data recorded on the tape so that transition between the last recorded scene and the next scene newly recorded is smooth upon starting the recording of the next scene. After the tape position is returned to the preceding position before rewinding, the rotary head cylinder 611 enters a recording standby mode.

After that, when receiving a recording start instruction from the user, the control unit 100 transmits a recording start command CT to the servo circuit 62 and the servo circuit 62 controls the rotary head cylinder 611 to perform the recording operation. Then, video data captured by shooting can be recorded on the DV tape loaded in the tape deck unit 60.

If the recording standby mode is continued for a prescribed period of time, the control unit 100 controls the servo circuit 62 to stop the rotary head cylinder 611 in order to protect the rotary head cylinder 611 and reduce power consumption. While the rotary head cylinder 611 is in a stop mode, when receiving a recording start instruction, the control unit 100 performs a sequence of changing from the stop mode to the recording standby mode and controls the recording operation.

In other words, the servo circuit 62 rotates the rotary head cylinder 611 which has been stopped. After that, in order to record video data received through the camera unit 10 and audio data as multiplexed data (MPEG signals) in the MPEG format, the servo circuit 62 controls the rotary head cylinder 611 to slightly rewind the tape from the current tape position, read compressed data recorded on the tape so that the transition between the last recorded scene and the next scene newly recorded is smooth upon starting the recording of the next scene, and return the tape position to the preceding position before rewinding. Then, the servo circuit 62 controls the rotary head cylinder 611 to perform the recording operation.

The reason why compressed data already recorded is read is as follows: In order to compress a video signal obtained by shooting in a compression encoding format using predictive coding, e.g., the MPEG format without causing any distortion in images played back, it is necessary to perform compression encoding in consideration of the previous compressed data (compressed video data) recorded on a recording medium.

Figure 3:
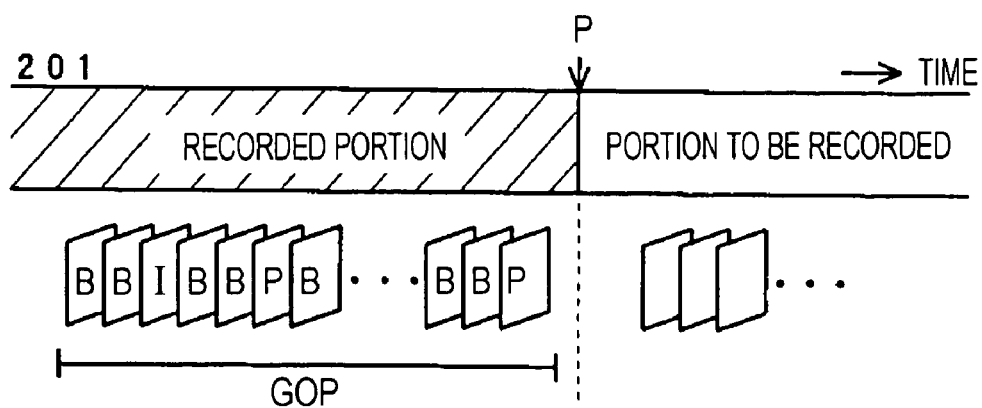
FIG. 3 is a diagram explaining smooth transition processing.

FIG. 3 is a diagram explaining a smooth transition sequence. Video and audio signals obtained by shooting are converted into digital signals, the digital signals are subjected to compression encoding (data compression) in the MPEG format, the compressed video data and audio data are multiplexed, and multiplexed data (MPEG signal) is recorded on a DV tape. In the following description, for the convenience of explanation, a case where only video signals obtained by shooting a subject have been compressed and encoded and then recorded as compressed data on the DV tape and video signals newly obtained by shooting are compressed and encoded and are then recorded on the DV tape will now be described as an example.

As shown in FIG. 3, it is assumed that compressed data has been recorded up to a position P of the DV tape 201. In the present embodiment, the compressed data recorded on the DV tape 201 is obtained by compression encoding in the MPEG format. Video data compressed in the MPEG format is made up of a series of I pictures, B pictures, and P pictures arranged in a predetermined order. One GOP (Group of Picture) comprising 15 pictures is one processing unit. As shown in the figure, each GOP includes one I picture.

In order to compress and encode newly captured video data and record the data just after compressed data already recorded on the DV tape 201 without causing any distortion in images played back, the last video data (compressed data) of one GOP recorded on the DV tape 201 is read out and is used for compression encoding of video data newly captured and recorded.

When new video data is compressed and encoded and is then recorded on the DV tape 201 so that transition between the compressed data already recorded on the DV tape 201 (data recoded on the left side of the position P in FIG. 3) and the newly recorded data is smooth, the new video data is subjected to compression encoding using the read-out data, thus generating compressed data to ensure a smooth transition. This compressed data can be recorded after the position P.

To compress and encode video data newly captured by shooting and then record the resultant data on a DV tape on which compressed data has already been recorded so that transition between the last recorded image and the next image newly recorded is smooth, it may take several seconds between when the rotary head cylinder 611 in the stop mode is activated and when recording of the compressed data on the DV tape is actually started because the step of reading the compressed data already recorded on the DV tape has to be performed.

In the digital camcorder according to the present embodiment, therefore, when video data newly captured by shooting is compressed and encoded and is then record on a DV tape on which compressed data has already been recorded, the step of reading the compressed data already recorded on the DV tape is omitted. After the rotary head cylinder 611 is positioned at a recording position on the DV tape, the newly captured video data can be immediately compressed and encoded and recording of the newly compressed data can be started.

As described above, in a conventional mode, in order to compress and encode video data newly captured by shooting and then record the resultant data on a DV tape on which compressed data has already been recorded so that the transition between the last recorded image and the next image newly recorded is smooth, the latest recorded compressed data of a predetermined amount (e.g., one GOP) is read out and is used for compression encoding of the video data to be newly recorded. In this specification, the conventional mode is called a smooth transition mode.

On the other hand, a new mode available in the digital camcorder according to the present embodiment is called a quick recording mode. In the quick recording mode, to compress and encode video data newly captured by shooting and then record the resultant data on a DV tape on which compressed data has already been recorded, the compressed data already recorded on the DV tape is not read out and the new video data is immediately compressed and encoded and is then recorded on the DV tape.

Figure 4:
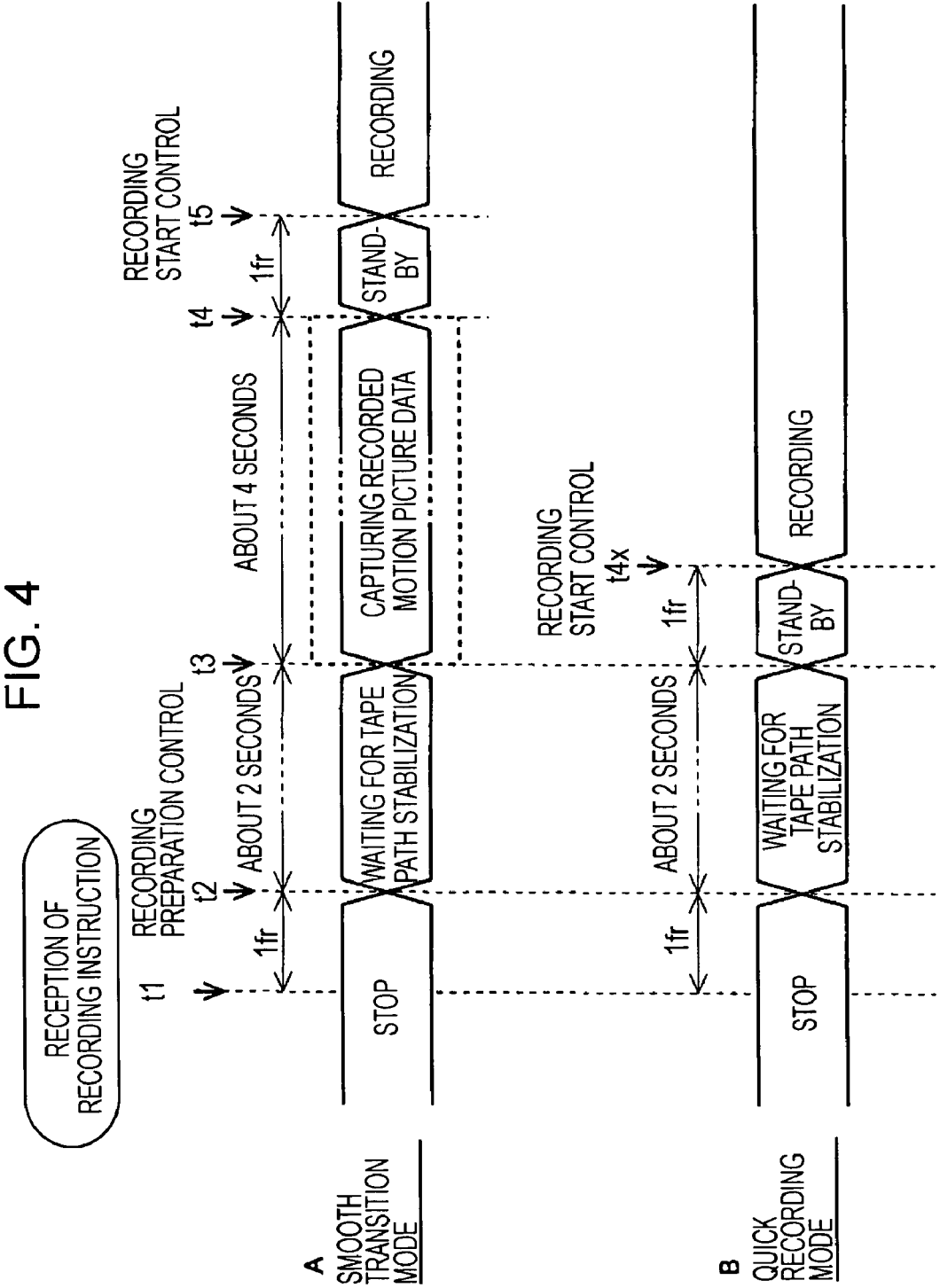
FIG. 4 is a diagram explaining a smooth transition mode and a quick recording mode.

FIG. 4 is a diagram explaining the conventional smooth transition mode and the newly available quick recording mode. In FIG. 4, A illustrates the smooth transition mode and B illustrates the quick recording mode. First, the conventional smooth transition mode will now be described with reference to A of FIG. 4.

It is assumed that the digital camcorder is turned on, any operation instruction is not entered by the user, the digital camcorder is stopped, and the control unit 100 receives a recording instruction (recording start instruction) from the user through the operation unit 110 at time t1 in A of FIG. 4. The control unit 100 recognizes the recording instruction and then issues an instruction to the tape deck unit 60 to prepare for recording. It takes a short time of about one frame (shown by 1Fr in FIG. 4) until the control unit 100 issues the instruction to the tape deck unit 60 after recognizing the recording instruction.

In response to the instruction, the tape deck unit 61 executes a process of positioning a DV tape loaded in the tape deck unit 60 at a position where the next data is recorded as described with reference to FIG. 2. Accordingly, it takes waiting time until the positioning is completed. The period of time elapsed until the rotary head cylinder 611 is positioned at the recording position on the DV tape corresponds to a time period for "waiting for tape path stability" in B of FIG. 4. It takes about two seconds.

After time t3 when the tape path is stabilized, the DV tape is slightly rewound, compressed data already recorded is read out, and the read data is supplied to the compression/decompression unit 40. This period of time is shown as "capturing recorded motion picture data (video data)". It takes about four seconds.

After the time period for capturing recorded motion picture data, the control unit 100 controls the compression/decompression unit 40 and the tape deck unit 60 to compress and encode video data newly captured by shooting and record the resultant data on the DV tape. It takes a time of about one frame (shown by 1Fr in FIG. 4) after the time period for capturing recorded motion picture data until the control unit 100 issues an instruction to compress and encode video data newly captured by shooting and start recording of the resultant data on the DV tape. Therefore, it takes a time corresponding to (about six seconds+two frames) between time t1 when the recording instruction is received and time t5 when recording of the compressed and encoded video data on the DV tape is actually started.

On the other hand, in the quick recording mode shown in B of FIG. 4, processing similar to that in the smooth transition mode shown in A of FIG. 4 is performed until time t3 when the period of waiting for tape path stabilization is completed. In other words, it is assumed that the digital camcorder is turned on, any operation instruction is not entered by the user, the digital camcorder is stopped, and the control unit 100 receives a recording instruction (recording start instruction) from the user through the operation unit 110 at time t1 in a manner similar to the case in A of FIG. 4.

The control unit 100 recognizes the recording instruction and then issues an instruction to the tape deck unit 60 to prepare for recording. It takes a very short time of about one frame (shown by 1Fr in FIG. 4) until the control unit 100 issues the instruction to prepare for recording after recognizing the recording instruction. The tape deck unit 60 executes the process of positioning a DV tape loaded in the tape deck unit 60 at a position where the next data is recorded as described with reference to FIG. 2. Accordingly, it takes waiting time until the positioning is completed. The period of time elapsed until the rotary head cylinder 611 is positioned at the recording position on the DV tape corresponds to a time period for "waiting for tape path stabilization" in B of FIG. 4. It takes about two seconds.

In the case of the quick recording mode shown in B of FIG. 4, compressed data already recorded is not read out. For a period of time of one frame (1Fr) just after time t3 when tape path stabilization is completed, the control unit 100 controls the compression/decompression unit 40 and the tape deck unit 60 to compress and encode video data newly captured by shooting and record the resultant data on the DV tape. Therefore, it takes a time corresponding to (about two seconds+two frames) between time t1 when the recording instruction is received and time t4x when recording of the compressed and encoded video data (compressed data) on the DV tape is actually started.

As mentioned above, in the quick recording mode available in the digital camcorder according to the present embodiment, recording of video data newly obtained by shooting on the DV tape can be started earlier than in the conventional smooth transition mode by four seconds. As compared to the smooth transition mode, therefore, the quick recording mode can prevent the user from missing an opportunity to shoot, so that a target scene of a subject can be recorded reliably on the DV tape.

In the quick recording mode, when video data to be newly recorded is compressed and encoded, compressed data already recorded on a DV tape is not read and used.

Unfortunately, therefore, images corresponding to the initial portion of the video data newly recorded may be slightly distorted. Accordingly, there are the following demands: When the user cannot continue shooting for a relatively long time because it causes a waste of DV tape and battery power but does not want to miss an opportunity to record, the user wants to use the quick recording mode.

In other cases, the user wants to use the conventional smooth transition mode.

Therefore, the digital camcorder according to the present embodiment permits the user to select between the conventional smooth transition mode and the new available quick recording mode and further permits the user to switch therebetween at any time.

Figure 5:
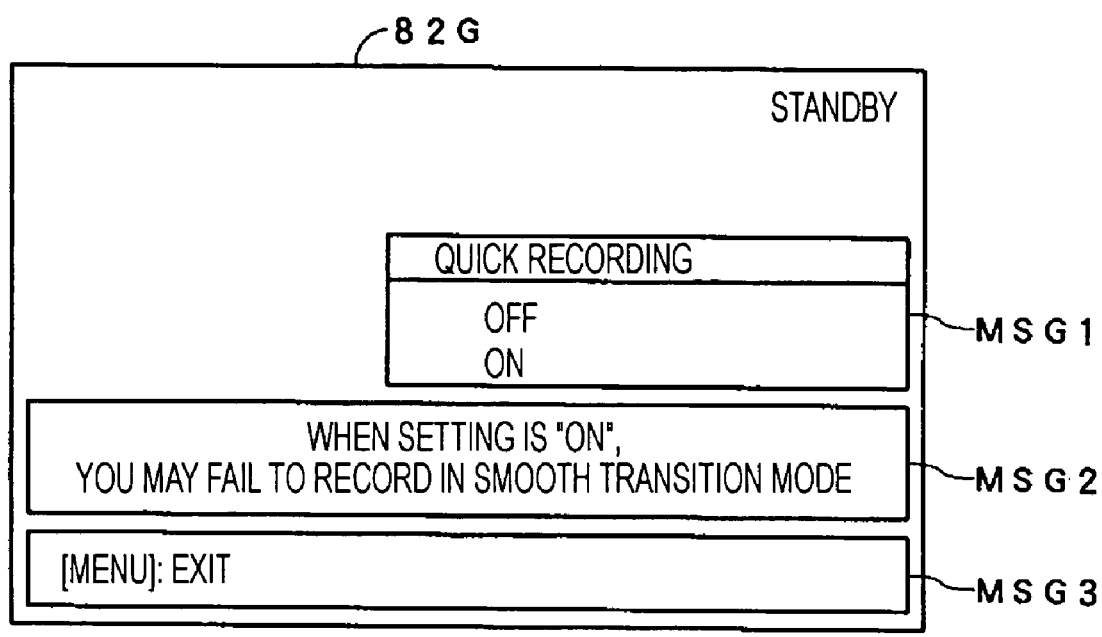
FIG. 5 is a diagram explaining a setting input window to select either ON or OFF of the quick recording mode.

FIG. 5 is a diagram explaining a setting input window to select either ON or OFF of the quick recording mode, the setting window being displayed on a display screen 82G of the LCD 82 of the digital camcorder according to the present embodiment. As for the setting window shown in FIG. 5, when the user performs a predetermined operation, e.g., presses a menu display key to display a menu on the display screen 82G of the LCD 82, the user may select "Quick Recording" provided as a selection item in the menu by operating arrow keys on the key operation unit 110 so as to position the cursor on the item. Thus, the setting window for quick recording shown in FIG. 5 is displayed.

The setting window for quick recording shown in FIG. 5 includes a selection window segment MSG1 to receive a setting input of whether the quick recording mode is turned on, a window segment MSG2 to notify that recording in the smooth transition mode cannot be performed and pictures corresponding to the initial portion of data to be recorded may be distorted when the quick recording mode is turned on, and an exit window segment MSG3 to exit out of the setting window.

More specifically, in the selection window segment MSG1, the user positions the cursor on a selection item "OFF" to turn off the quick recording mode using the arrow keys of the operation unit 110, alternatively, on a selection item "ON" to record pictures in the quick recording mode using the arrow keys and then performs the predetermined confirming operation, so that the user can select between "OFF" and "ON" of the quick recording mode.

In the case where the quick recording mode is "ON", when a scene is shot and recorded, the shot scene can be rapidly recorded on a DV tape in the quick recording mode.

The smooth transition mode can be selected and set in a manner similar to the quick recording mode shown in, e.g., FIG. 5. The smooth transition mode and the quick recording mode cannot be simultaneously turned on. When any one of the modes is turned on, the other mode is necessarily turned off.

The following setting may be performed: When the quick recording mode is turned on, the smooth transition mode is automatically turned off. When the quick recording mode is turned off, the smooth transition mode is automatically turned on. In other words, the latest setting may be regarded as valid and the preceding setting can be changed.

The operation unit 110 may include a key to turn on or off the quick recording mode. When this key is directly operated, the recording mode can be simply switched therebetween.

In the case where the user may arbitrary select between the smooth transition mode and the quick recording mode as mentioned above, when the smooth transition mode is selected, as shown in A of FIG. 4, it takes about six seconds between when a recording start instruction is issued and when recording of video data obtained by shooting on a DV tape is actually started.

Accordingly, information indicating that recording is being prepared may be given to the user for a period of time after the recording start instruction is issued until recording of the video data on the DV tape is actually started, so that it is possible to clearly inform the user from which image is actually recorded on the DV tape.

Figure 6A:
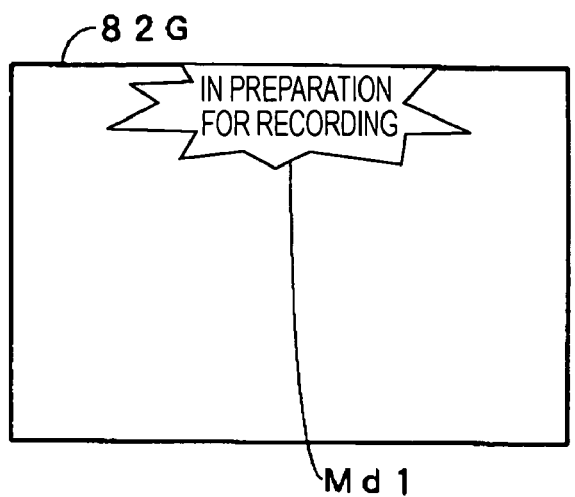
FIG. 6A is a diagram explaining a display example of a display indicating that recording is being prepared on a display screen 82G of an LCD 82.
Figure 6B:
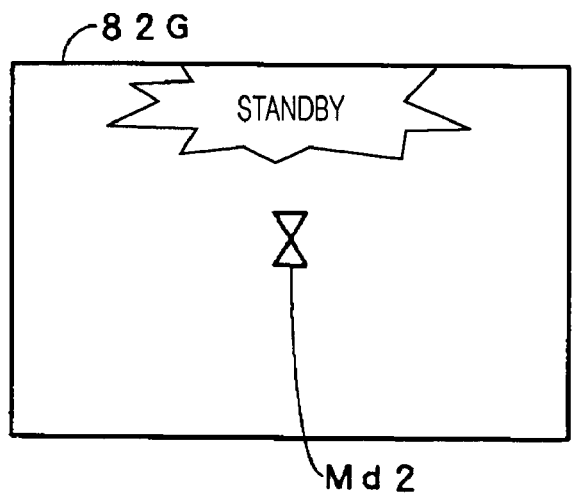
FIG. 6B is a diagram explaining a display example of another display indicating that recording is being prepared on the display screen 82G of the LCD 82.
Figure 6C:
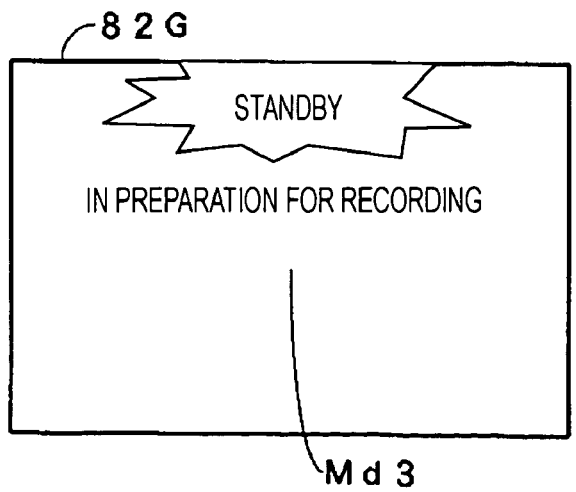
FIG. 6C is a diagram explaining a display example of another display indicating that recording is being prepared on the display screen 82G of the LCD 82.

FIGS. 6A to 6C are diagrams explaining display examples displayed on the display screen 82G of the LCD 82 for a period of time after a recording start instruction is issued until recording of video data obtained by shooting on a DV tape is actually started. Those display examples indicate that recording of video data on the DV tape is not yet performed and the recording is being prepared.

FIG. 6A shows a case using a mode display Md1 which does not cover most of a displayed picture and shows a message indicating that recording is being prepared, the mode display being displayed on the upper portion, which relatively stands out, of the display screen 82G. The mode display Md1 may be simply displayed. Alternatively, the mode display Md1 can be repeatedly switched between the display state and the non-display state, i.e., the mode display Md1 can blink.

FIG. 6B shows a case using a predetermined icon Md2 indicating that recording is being prepared. Various types of icons can be used. In this case, the icon can be repeatedly switched between the display state and the non-display state, i.e., the icon Md2 can blink. In this instance, the icon Md2 alone may be displayed.

Alternatively, a mode display indicating that recording is being prepared (a display including text "STANDBY" in FIG. 6B) may be simultaneously displayed in the upper portion of the display screen 82G.

FIG. 6C shows a case using text information Md3 notifying that recording is being prepared, the information being displayed in the middle of the display screen. In this case, the text information Md3 can be repeatedly switched between the display state and the non-display state, i.e., the text information Md3 can blink. In this instance, the text Md3 alone may be displayed. Alternatively, a mode display (including text "STANDBY" in FIG. 6C) indicating that recording is being prepared may be simultaneously displayed in the upper portion of the display screen 82G.

The positions of the mode display Md1, the icon Md2, and the text information Md3 are not limited to those in the examples shown in FIGS. 6A to 6C. They can be displayed in various positions on the display screen 82G. Any one of the mode display Md1, the icon Md2, and the text information Md3 may be displayed. Alternatively, arbitrarily selected two of them can be simultaneously displayed. Alternatively, all of the mode display Md1, the icon Md2, and the text information Md3 may be used.

As described above, a designed display notifying that recording is being prepared is displayed for a period of time after a recording start instruction is issued until recording of video data obtained by shooting on a DV tape is actually started. Consequently, for example, even when the user selects the smooth transition mode, it is possible to clearly inform the user that recording will start soon. In addition, the user can clearly know from which image is actually recorded on the DV tape. Advantageously, such a problem that the user later finds that a target scene have not been recorded can be prevented.

In the above description, in the case where the smooth transition mode is selected, a display indicating that recording of video data on the DV tape is not yet performed is performed for a period of time after a recording start instruction is issued until recording of video data obtained by shooting on the DV tape is actually started. The present invention is not limited to the above case.

In the case where the above-described quick recording mode is selected, the length of time between when a recording start instruction is issued and when recording of video data obtained by shooting on a DV tape is actually started is about two seconds, i.e., it is about one-third that of the smooth transition mode. However, it takes a very short time after the recording start instruction is issued until recording of video data obtained by shooting on the DV tape is actually started. A display indicating that recording is being prepared as shown in any of FIGS. 6A to 6C may be performed for this time period.

Recording Control Method

As is clear from the above description regarding the digital camcorder according to the present embodiment, in the case where the quick recording mode is selected and video data is compressed and encoded and is then additionally recorded on a DV tape on which compressed data has already been recorded, when the user operates the digital camcorder to start recording (REC start), the control unit 100 controls the tape deck unit 60 to rotate the rotary head cylinder 611 and perform the process of positioning the DV tape at the next recording position. A period of time for the process corresponds to the time period for waiting for tape path stabilization shown in B of FIG. 4.

After the tape path is stabilized, the control unit 100 controls the compression/decompression unit 40 and the tape deck unit 60 to compress and encode only the video data newly obtained by shooting in a predetermined format without using the compressed data already recorded on the DV tape as a recording medium (step 1) and start the recording of compressed and encoded video data (compressed data) on the DV tape (step 2). As described above, in the quick recording mode, the compressed data already recorded on the DV tape, serving as a recording medium, is not read out.

Consequently, the process of compressing and encoding video data captured by shooting and recording the compressed data on the DV tape can be rapidly started, thus minimizing the loss of opportunities to shoot.

In the above-described digital camcorder according to the present embodiment, it is possible to select between the conventional smooth transition mode and the above-described quick recording mode. In the case where the smooth transition mode is selected, when the user instructs the recording start (REC start) operation, the control unit 100 controls the tape deck unit 60 to rotate the rotary head cylinder 611 and perform the process of positioning the DV tape at the next recording position where the compressed and encoded video data is recorded. A period of time for the process corresponds to the time period for waiting for tape path stabilization shown in A of FIG. 4.

After the tape path is stabilized, the control unit 100 performs a process of slightly rewinding the DV tape from the current position, reading the compressed data already recorded on the DV tape so that transition between the last scene recorded and the next scene newly recorded is smooth, and returning the DV tape to the preceding position before rewinding (step 1). A period of time for reading the recorded video data corresponds to the time period for capturing recorded data.

The control unit 100 controls the compression/decompression unit 40 and the tape deck unit 60 to compress and encode video data obtained by shooting in the predetermined format using the read-out compressed data already recorded on the DV tape (step 2) and start recording of the compressed and encoded video data on the DV tape (step 3).

As described above, in the digital camcorder according to the present embodiment, when the quick recording mode is selected, after the time period for waiting for tape path stabilization, two steps, i.e., the step (step 1) of compressing and encoding only video data to be recorded without using video data previously recorded and the step (step 2) of recording the compressed and encoded video data on a DV tape are performed in that order.

When the smooth transition mode is selected, after the time period for waiting for tape path stabilization, three steps, i.e., the step (step 1) of capturing recorded motion picture data (recorded video data), the step (step 2) of compressing and encoding video data to be recorded using the compressed data already recorded on a DV tape, and the step (step 3) of recording the compressed and encoded video data on the DV tape are performed in that order.

As described above, video data can be more rapidly recorded on the DV tape in the quick recording mode than in the conventional smooth transition mode because compressed data already recorded on the DV tape is not read out in the quick recording mode.

A digital camcorder may be configured to include a quick recording mode function alone and exclude a smooth transition mode function.

As described above, in the digital camcorder according to the present embodiment, when video data obtained by shooting is compressed and encoded using predictive coding and is then recorded on a recording medium, the video data can be rapidly recorded on the recording medium without performing the preparation operation of capturing motion picture data, which has already been recorded on the recording medium and serves as the last data.

In addition, the user can select between the smooth transition mode (recording method in which it takes time until actual recording starts because the smooth transition sequence is performed) and the quick recording mode (recording method in which it takes a shorter time until actual recording starts than the above method because the smooth transition sequence is not performed). Therefore, the user can select between the smooth transition mode and the quick recording mode in accordance with a subject to be shot by operating a predetermined key on the operation unit 110.

In the case where it takes time after the user issues a recording start request until actual recording starts because the smooth transition sequence is performed, a sign or information indicating that recording is being prepared is displayed on the LCD or the like as described above using FIGS. 6A to 6C. Thus, it is possible to clearly inform the user that recording is being prepared.

In the above description, in the digital camcorder according to the present embodiment, video data obtained by shooting is compressed and encoded in accordance with the MPEG format. The present invention is not limited to the above case. The present invention can be applied to cases using various compression encoding methods in each of which compressed data already recorded on a recording medium is needed because predictive coding is used to additionally record video data on the recording medium on which video data has already been recorded.

In the above description of the present embodiment, the quick recording mode is used to record video data obtained by shooting through the camera unit 10. The present invention is not limited to the case. For example, video signals externally supplied through the SD input terminal can be recorded in the quick recording mode.

A recording medium used is not limited to a DV tape. The present invention can be applied to cases using various recording media, e.g., an optical disk such as a writable CD (Compact Disc) or a writable DVD (Digital Versatile Disc), a magneto-optical disk such as an MD (Mini Disc), and a memory card using a semiconductor memory.

The invention claimed is:

1. A device comprising:
compression means for compressing a video signal by a data compression method using predictive coding;
writing/reading means for performing a process of writing compressed data obtained by the compression means to a recording medium and a process of reading already recorded compressed data from the recording medium;
control means for controlling the compression means and the writing/reading means so that the compressed data already recorded on the recording medium is not used for compression encoding of the video signal to be newly recorded; and
receiving means for receiving an input indicating a selected mode upon starting the recording of the video signal, the mode being selected between one mode where the compressed data already recorded on the recording medium is not used for compression encoding of the video signal to be newly recorded and the other mode where the compressed data already recorded on the recording medium is read out and is used for compression encoding of the video signal to be newly recorded, wherein when the mode where the compressed data already recorded on the recording medium is read out and is used for compression encoding of the video signal to be newly recorded is selected, the control means controls the compression means and the writing/reading means to read out the compressed data already recorded on the recording medium and use the read-out data for compression encoding of the video signal to be newly recorded.

2. The device according to claim 1, further comprising:
notification means for notifying a user that recording is being prepared for a period of time after a recording start request is received from the user until the recording of the compressed data on the recording medium is actually started.

3. The device according to claim 1, further comprising:
notification means for notifying a user that recording is being prepared for a period of time after a recording start request is received from the user until the recording of the compressed data on the recording medium is actually started when the second mode is selected upon starting the recording of the video signal.

4. A recording control method comprising:
a first compression step of compressing a video signal captured in the imaging step by a data compression method using predictive coding so that compressed data already recorded on a recording medium is not used for compression encoding of the video signal to be newly recorded;
a first recording step of recording compressed and encoded video data obtained in the first compression step on the recording medium;
a receiving step of receiving an input indicating a selected mode, the mode being selected between a first mode where the compressed data already recorded on the recording medium is read out but is not used for compression encoding of the video signal to be newly recorded and a second mode where the compressed data already recorded on the recording medium is read out and is used for compression encoding of the video signal to be newly recorded;
a reading step of reading out the compressed data already recorded on the recording medium when the selected mode is the second mode and is received in the receiving step;
a second compression step of performing compression encoding on the video signal to be newly recorded using the compressed data, already recorded on the recording medium, read out in the reading step; and
a second recording step of recording compressed data, obtained by compression encoding in the second compressed step, on the recording medium.

5. The recording control method according to claim 4, further comprising:
a notification step of notifying a user that recording is being prepared for a period of time after a recording start request is received from the user until the recording of the compressed data on the recording medium is actually started.

6. The recording control method according to claim 4, further comprising:
a notification step of notifying a user that recording is being prepared for a period of time after a recording start request is received from the user until the recording of the compressed data on the recording medium is actually started when the mode where the compressed data already recorded on the recording medium is read out and is used for compression encoding of the video signal to be newly recorded is selected upon starting the recording of the video signal.

7. A device comprising:
a compression unit for compressing a video signal using predictive coding;
a writing/reading unit for performing a process of writing compressed data obtained by the compression unit to a recording medium and a process of reading already recorded compressed data from the recording medium;
a control unit for controlling the compression unit and the writing/reading unit so that the compressed data already recorded on the recording medium is not used for compression encoding of the video signal to be newly recorded; and
a receiving unit for receiving an input indicating a selected mode upon starting the recording of the video signal, the mode being selected between a first mode where the compressed data already recorded on the recording medium is not used for compression encoding of the video signal to be newly recorded and a second mode where the compressed data already recorded on the recording medium is read out and is used for compression encoding of the video signal to be newly recorded,
wherein when the second mode is selected, the control unit controls the compression unit and the writing/reading unit to read out the compressed data already recorded on the recording medium and use the read-out data for compression encoding of the video signal to be newly recorded.

8. The device according to claim 7, further comprising:
a notification unit for notifying a user that recording is being prepared for a period of time after a recording start request is received from the user until the recording of the compressed data on the recording medium is actually started.

9. The device according to claim 7, further comprising:
a notification unit for notifying a user that recording is being prepared for a period of time after a recording start request is received from the user until the recording of the compressed data on the recording medium is actually started when the second mode is selected upon starting the recording of the video signal.

* * * * *